United States Patent [19]
Sakaki et al.

[11] Patent Number: 5,826,007
[45] Date of Patent: Oct. 20, 1998

[54] MEMORY DATA PROTECTION CIRCUIT

[75] Inventors: Kinya Sakaki, Tokyo; Kimio Mori, Kawasaki, both of Japan

[73] Assignee: Kabushiki Kaisha Toshiba, Kawasaki, Japan

[21] Appl. No.: 785,297

[22] Filed: Jan. 21, 1997

[30] Foreign Application Priority Data

Jan. 22, 1996 [JP] Japan ................................... 8-008499

[51] Int. Cl.$^6$ .................................................. G06F 11/00
[52] U.S. Cl. ...................................................... 395/183.18
[58] Field of Search ........................ 395/183.18, 183.03, 395/186, 800.32, 800.37, 800.42; 365/201, 185.04, 244; 371/51.1; 364/184, 550, 551.01, 481, 221.7, 244.6, 246.6, 246.8, 246.9, 247.3, 286.4, 286.5; 711/102, 103, 152

[56] References Cited

U.S. PATENT DOCUMENTS

| | | | |
|---|---|---|---|
| 4,698,750 | 10/1987 | Wilkie et al. | 364/200 |
| 5,014,191 | 5/1991 | Padgaonkar et al. | 364/200 |
| 5,293,610 | 3/1994 | Schwarz | 395/425 |
| 5,432,950 | 7/1995 | Sibigtroth | 395/425 |
| 5,526,311 | 6/1996 | Kreifels et al. | 365/201 |
| 5,563,832 | 10/1996 | Kagami | 365/200 |
| 5,704,039 | 7/1994 | Yishay et al. | 395/186 |

*Primary Examiner*—Robert W. Beausoliel, Jr.
*Assistant Examiner*—Stephen C. Elmore
*Attorney, Agent, or Firm*—Oblon, Spivak, McClelland, Maier & Neustadt, P.C.

[57] ABSTRACT

A memory data protection circuit is provided on a one-chip microcomputer having a CPU, ROM, volatile memory, and nonvolatile memory which together with an input/output control circuit are connected to each other via a first bus line. A security flag storage circuit receives a security flag consisting of a plurality of bits. In one state the security flag cannot be rewritten once it has been written. A security flag monitor circuit reads the security flag and when receiving the power-on reset signal recognizes the flag contents. A bus line control circuit controls the connections of the first bus line, a second bus line connected to the ROM, and a third bus line connected to a test-only memory in response to the security flag monitor circuit When the security flag indicates test mode before shipment, the bus line control circuit controls connections so a shift to the test mode may be possible; when it indicates normal operation mode after shipment, a shift to the test mode may be impossible; and when it indicates test mode after shipment, a shift to the test mode may be possible with the ROM disconnected from the second bus line.

6 Claims, 2 Drawing Sheets

MEMORY DATA PROTECTION CIRCUIT

BACKGROUND OF THE INVENTION

This invention relates to a memory data protection circuit, and more particularly to a memory data protection circuit for preventing the unauthorized reading and writing of memory data to protect the secrecy of the memory data in a one-chip microcomputer that has a CPU (central processing unit) and a memory formed on a single chip.

In the processes of manufacturing one-chip microcomputers, reading and writing tests of internal memories (memory tests) have been carried out by manufacturers.

For example, a memory test in a conventional one-chip microcomputer having an ordinary configuration as shown in FIG. 1 will be explained. In the figure, numeral 10 indicates a CPU, 11 a bus line, 12 a ROM (read-only memory) in which a system program and fixed data are stored, 13 a data storage volatile memory (e.g., RAM), 14 a data storage nonvolatile memory (e.g., EEPROM), 15 an input/output control circuit section, 16 an input/output terminal, 17 a test ROM in which a memory test program and others are stored, 18 a test terminal, 19 a fuse circuit, and 20 a decoding circuit.

In the one-chip microcomputer, when a test control cipher signal is externally inputted to the decoding circuit 20 via the test terminal 18 and fuse circuit 19, the decoding circuit then recognizes the contents of the cipher signal and, on the basis of the recognition result (decoding output), decides whether to bring the one-chip microcomputer into the test mode.

The test control cipher signal is, for example, a signal changing from the high level to the low level, or a signal changing from the low level to the high level, or a signal alternating between the high level and the low level at regular intervals of time.

When the microcomputer has been brought into the test mode, the CPU 10 executes the contents of the memory test program stored in the test ROM 17. In this case, in a data read operation, the data stored in the ROM 12, volatile memory 13, and nonvolatile memory 14 are read and outputted to the outside via the input/output control circuit section 15 and input/output terminal 16.

In a data write operation, the data is externally inputted via the input/output terminal 16 and input/output control circuit section 15 and is written in the memory space of the volatile memory 13 and nonvolatile memory 14.

There may be a case where the microcomputer is prevented from going to the test mode again by cutting off the fuse circuit 19 after the memory test.

For the memory test, another method that uses no test ROM 17 may be used. In the memory test, when the decoding circuit 20 has recognized that the contents of the test control signal indicate an instruction for a shift to the test mode, the CPU 10 is disconnected completely from the bus line 11 and the input/output control circuit section 15 is controlled so that access to all of the memories may be controlled directly from the input/output terminal 16. This enables the reading and writing of the data from and into each memory. Cutting off the fuse circuit 29 after memory test disables the microcomputer from going into the test mode again.

The one-chip microcomputer must be designed to enable the manufacturer to carry out a memory test easily at any time before shipment. Additionally, to protect the secrecy of the data stored in the ROM 12 and nonvolatile memory 13 (e.g., the data peculiar to the user) after shipment, it is necessary to increase the security of the data protection function that prevents the unauthorized reading of the memory data.

Conventional means for providing a memory data protection function have employed the following configurations: (1) a configuration where the fuse circuit 19 is cut off after a memory test, thereby preventing the microprocessor from going into the test mode again (accessing the internal memory), and (2) a configuration where the decoding circuit 20 is caused to recognize the contents of the test control signal and the microprocessor is allowed to go into the test mode only when the decoding circuit has recognized that the contents indicate an instruction to shift to the test mode.

With the configuration using the fuse circuit 19 in (1), however, once the fuse circuit 19 has been cut off, it is impossible to bring the microprocessor into the test mode again, when the manufacturer or the user wants to run a memory test at a later time. As a result, the manufacturer or the user cannot carry out a memory test again (repeat the memory test), making it difficult to increase the reliability of the one-chip microcomputer.

Furthermore, with the configuration using the decoding circuit 20 in (2), because a shift to the test mode is made easily if the test control cipher signal is known to a third party, this makes it possible to read and write the data, resulting in a poor security of data protection. In addition, an authorized shift to the test mode enables the unauthorized rewriting of the data in the nonvolatile memory, causing serious problems, including unauthorized use of a system using a one-chip microcomputer system (e.g., the forgery of one-chip microcomputer-based IC cards)

BRIEF SUMMARY OF THE INVENTION

It is, accordingly, an object of the present invention to solve the problems by providing a data protection circuit that not only enables memory tests on a ROM and nonvolatile memory in a one-chip microcomputer to be repeated, but also increase the security of the data protection functions that protect the secrecy of the memory data.

The foregoing object is accomplished by providing a memory data protection circuit provided in a one-chip microcomputer having a CPU, a ROM, a volatile memory, and a nonvolatile memory formed on a single chip, the memory data protection circuit comprising: a first bus line connected to the CPU, the volatile memory, the nonvolatile memory, and an input/output control circuit; a second bus line connected to a ROM storing a system program; a third bus line connected to a test-only memory storing a memory test program; a security flag storage circuit to which a security flag consisting of a plurality of bits is inputted, into which the security flag is written on receipt of a control signal so that the logic level of the flag may change in one direction, and which stores the security flag in a state where the flag cannot be rewritten once the flag has been written; a power-on reset circuit that outputs a power-on reset signal when the power supply for the one-chip microcomputer has been turned on; a security flag monitor circuit that reads the security flag stored in the security flag storage circuit when receiving the power-on reset signal and recognizes the contents of the flag; and a bus line control circuit which controls the connection of the first bus line, the second bus line and the third bus line according to the recognition result of the security flag monitor circuit, and which controls their connection so that a shift to the test mode may be possible, when the security flag indicates the test mode before shipment, controls their connection so that a shift to the test mode may be impossible, when the security flag indicates the normal operation mode after shipment, and controls their connection so that a shift to the test mode may be possible with the ROM being disconnected from the second bus line, when the security flag indicates the test mode after shipment.

Furthermore, the foregoing object is accomplished by providing a memory data protection circuit provided in a one-chip microcomputer having a CPU, a ROM, a volatile memory, and a nonvolatile memory formed on a single chip, the memory data protection circuit comprising: a first bus line connected to the CPU, the volatile memory, the nonvolatile memory, and an input/output control circuit; a second bus line connected to a ROM storing a system program; a third bus line connected to a test-only memory storing a memory test program; a security flag storage circuit to which a security flag consisting of a plurality of bits is inputted, into which the security flag is written on receipt of a control signal so that the logic level of the security flag may change in one direction, and which stores the security flag in a state where the flag cannot be rewritten once the flag has been written; a power-on reset circuit that outputs a power-on reset signal when the power supply for the one-chip microcomputer has been turned on; a security flag monitor circuit that reads the security flag stored in the security flag storage circuit when receiving the power-on reset signal and recognizes the contents of the flag; and a bus line control circuit which controls the connection of the first bus line with the CPU according to the recognition result of the security flag monitor circuit and which, when the security flag indicates the test mode before shipment, disconnects the CPU completely from the first bus line and controls the input/output control circuit section so that access to all of the memories may be controlled directly from the input/output terminal to enable a shift to the test mode and which controls the connection so that a shift to the test mode may be impossible, when the security flag indicates the normal operation mode after shipment, and which controls the connection so that a shift to the test mode may be possible with the ROM being disconnected from the second bus line, when the security flag indicates the test mode after shipment.

Each of the aforementioned configurations enables the memory data protection circuit of the invention not only to test the ROM, nonvolatile memory, and the like in a one-chip microcomputer repeatedly, but also to increase the security of the data protection function of protecting the secrecy of the memory data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, referring to the accompanying drawings, an embodiment of the present invention will be explained.

Figure 1:
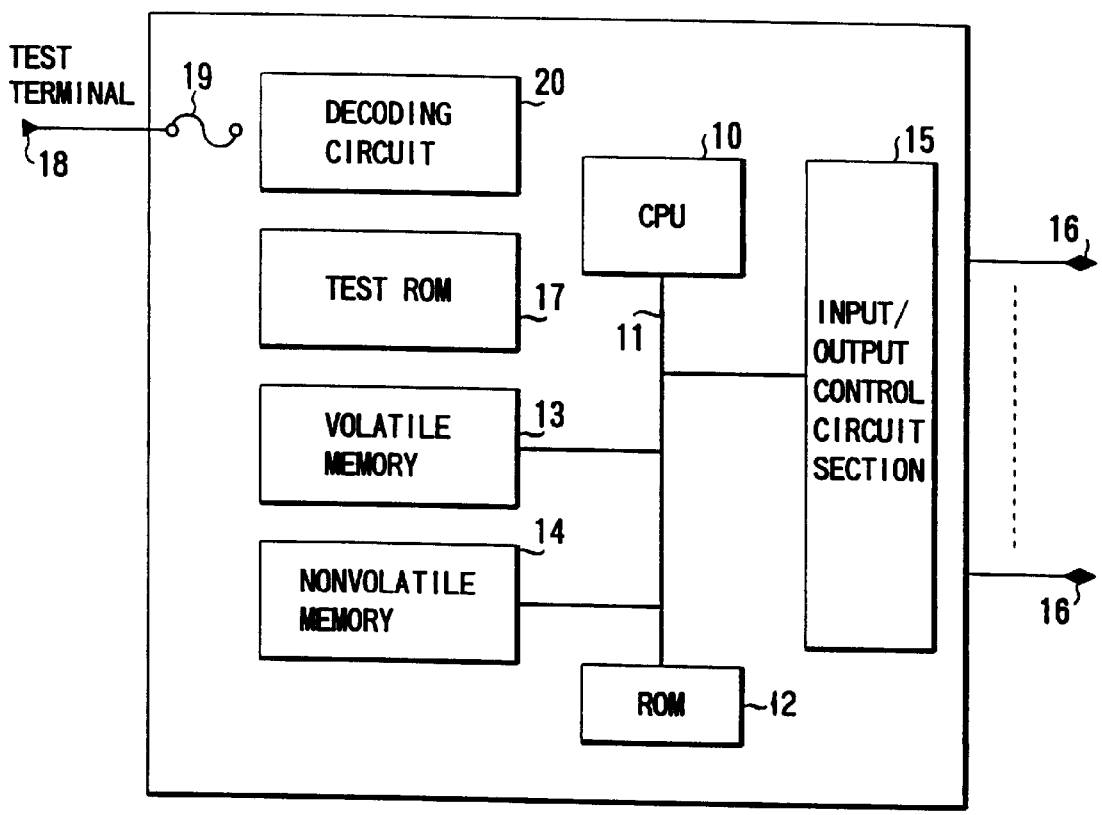
FIG. 1 is a block diagram of a one-chip microcomputer with a conventional data protection circuit.
Figure 3:
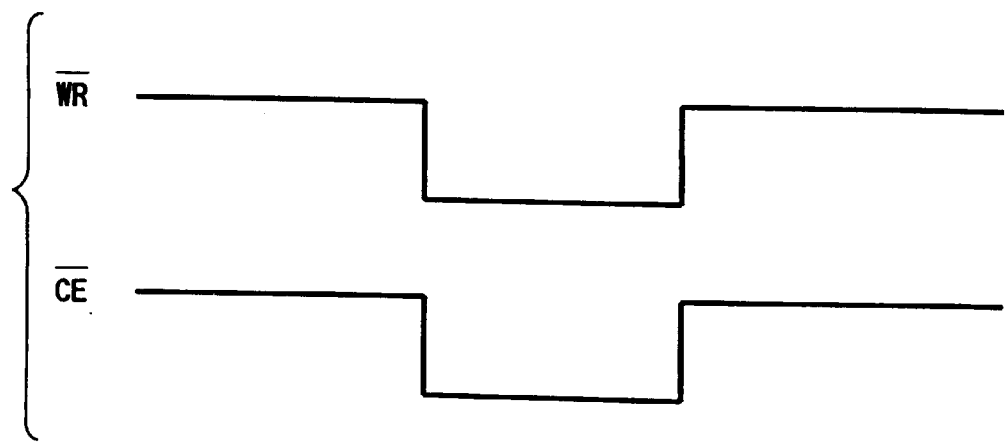
FIG. 3 is a waveform diagram to help explain the control operation of rewriting the security flag in the one-chip microcomputer shown in FIG. 1.

FIG. 1 is a block diagram of a one-chip microcomputer with a memory data protection circuit according to an embodiment of the present invention.

Figure 2:
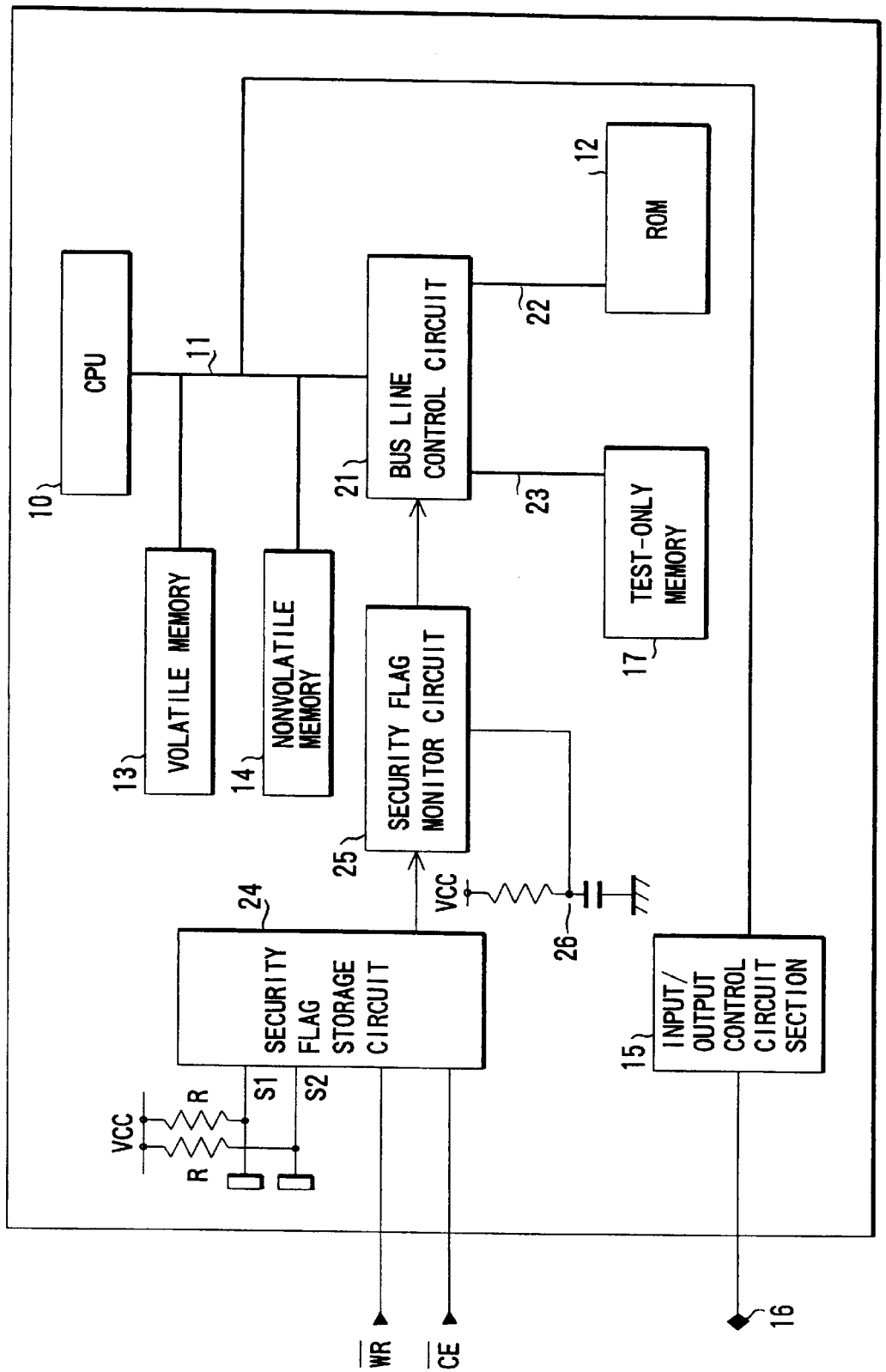
FIG. 2 is a block diagram of a one-chip microcomputer with a data protection circuit according to an embodiment of the present invention.

The one-chip microcomputer of FIG. 2 differs in block diagram from the conventional one-chip microcomputer of FIG. 1 in that (1) a ROM 12 and a test-only memory 17 are connected to a bus line 11 via a bus line control circuit 21, (2) a security flag is written in a security flag storage circuit 24, when a control signal is inputted, and (3) the security flag is monitored by a security flag monitor circuit 25, which supplies the monitor output to the bus line control circuit 21. The configuration of the one-chip microcomputer of FIG. 2 is the same as that of the conventional one except for the above-described points.

Specifically, in FIG. 2, reference numeral 10 indicates a CPU, 12 a ROM in which a system program and fixed data are stored, 13 a data storage volatile memory (e.g., RAM), 14 a data storage nonvolatile memory (e.g., EEPROM), 15 an input/output control circuit section, 17 a test-only memory (e.g., test ROM) in which a memory test program and others are stored.

The CPU 10, volatile memory 13, nonvolatile memory 14, and input/output control circuit 15 are connected to each other via a first bus line 11. The ROM 12 is connected to a second bus line 22 and the test-only memory 17 is connected to a third bus line 23.

Numeral 16 indicates an input/output terminal connected to the input/output control circuit 15 and 26 indicates a power-on reset circuit that outputs a power-on reset signal at the time that the power supply of the one-chip microcomputer has been turned on.

A security flag storage circuit 24 stores a security flag consisting of one to several bits of data (in the embodiment, two bits of data S1, S2). In this case, the security flag storage circuit is designed to store two bits of data S1, S2 of the low level at first and, when receiving a chip enable signal /CE input and a write/read control signal /WR input, takes in the high-level signal supplied via a resistance R from a power-supply potential (Vcc) node as part of the security flag.

Specifically, when the control input /CE input and /WR input are supplied, writing is done so that the logic level of the bit data of part of the security flag may change in one direction (in the embodiment, from the low level to the high level). The security flag storage circuit can store the high level. Once the individual bits S1, S2 of the security flag have been brought into the high level, the high level has been stored in a manner that prevents rewriting thereafter.

A security flag monitor circuit 25 is designed to read the security flag stored in the security flag storage circuit 24 when receiving the power-on reset signal, and supply the recognition result to the bus line control circuit 21.

The bus line control circuit 21 is designed to control the connection of the individual bus lines 11, 22, and 23 according to the recognition result of the security flag monitor circuit 25.

In this case, (a) when receiving the recognition result that the two bits S1 and S2 of the security flag are at the low level (in the test mode before shipment), the bus line control circuit controls the bus-line connections so that a shift to the test mode may be possible, (b) when receiving the recognition result that the two bits S1 and S2 of the security flag are at the high level and at the low level, respectively (the normal operation mode after shipment), the bus line control circuit controls the bus-line connection so that a shift to the test mode may be impossible, and (c) when receiving the recognition result that the two bits S1 and S2 of the security flag are at the high level (the test mode after shipment), the bus line control circuit controls the bus-line connections so that a shift to the test mode may be possible.

Next, the data protection operation in the one-chip microcomputer will be explained.

In the manufacturing processes of the one-chip microprocessor, the individual bits S1 and S2 in the security flag are at the low level at first. When the power supply is turned on and a power-on set signal goes high, the security flag monitor circuit 25 reads the security flag and recognizes the logic level of each of the bits S1 and S2.

Then, the security flag monitor circuit 25 supplies the recognition result to the bus line control circuit 21.

When receiving the recognition result that the individual bits S1 and S2 of the security flag are at the low level (the test mode before shipment), the bus line control circuit 21 performs control so that the individual bus lines 11, 22, and 23 may be connected (i.e., the ROM 12, volatile memory 13, nonvolatile memory 14, and test-only memory 17 may be connected to the CPU 10).

This enables a shift to the test mode, allowing the CPU 10 to execute the contents of the memory test program stored in the test-only memory 17.

In the test memory, when the data in the ROM 12, volatile memory 13, and nonvolatile memory 14 are read out, the read-out data is outputted to the outside via the input/output control circuit 15 and input/output terminal 16, using the read instruction stored in the test-only memory 17. In addition, when the data is written into the volatile memory 13 and nonvolatile memory 14, the write data is inputted via the input/output terminal 16 and input/output control circuit section 15.

As shown in FIG. 2, when the control inputs /CE and /WR are supplied after the memory test has finished, bit S1 of the security flag is brought into the high level and bit S2 is left at the low level. It is assumed that the one-chip microcomputer is shipped with that state.

After the one-chip microcomputer has been brought in that state, the power supply is turned on, which causes a power-on reset signal to go high. The security flag monitor circuit 25 reads the security flag and recognizes the logic levels of the individual bits S1 and S2 (the normal operation mode after shipment). On the basis of the recognition result, the bus line control circuit 21 disconnects the third bus line 23 and test-only memory 17 from the bus line 11, with the second bus line 22 connected to the first bus line 11.

This prevents a shift to the test mode and the CPU 10 cannot execute the contents of the memory test program stored in the test-only memory 17 and performs a normal operation, that is, executes the contents of the program stored in the ROM 12.

In contrast, in a case where the manufacturer or the user needs to carry out a memory test after the one-chip microcomputer has been brought in that state, when the control inputs /CE and /WR are supplied as shown in FIG. 2, bit S1 of the security flag remains at the high level and bit S2 is brought into the high level, enabling the microcomputer to go to the test mode.

Specifically, in the state, the power supply is turned on, which causes the power-on reset signal to go back high. Then, the security flag monitor circuit 25 reads the security flag and recognizes the logic levels of the individual bits S1 and S2 (the test mode after shipment). On the basis of the recognition result, the bus line control circuit 21 disconnects the second bus line 22 and ROM 12 from the first bus line 11, with the third bus line 23 connected to the first bus line 11. Additionally, the bus line control circuit 21 changes the address of the instruction that the CPU 10 is to execute first to a specific address.

This makes a shift to the test mode impossible, enabling the CPU 10 to execute the contents of the specific address. Because the address holds a program that erases the data stored in the nonvolatile memory 14, the operation of erasing the data in the non-volatile memory is carried out.

After the data in the nonvolatile memory 14 has been erased, the memories except for the ROM 12 can be tested. In this situation, even if a third party attempts to read the internal data from the one-chip microcomputer, making use of the test mode, they cannot access the ROM 12 and therefore cannot get the correct data (the data before erasure) in the nonvolatile memory 14. Instead, they can only get meaningless data, causing no security problem.

Furthermore, even if the third party has rewritten the internal data in the one-chip microcomputer without permission, making use of the test mode, with the memories except for the ROM 12 being able to be tested as described above, the one-chip microcomputer cannot operate properly. Specifically, when the power supply has been turned on after the unauthorized rewriting, the power-on signal goes high. This always brings the microcomputer into the test mode and then the operation of erasing the data in the nonvolatile memory 14 is carried out again, which makes it impossible for the one-chip microcomputer to operate as expected.

Therefore, with the data protection circuit in the embodiment, a memory test can be carried out easily at any time both before and after the shipment of the one-chip microcomputer, which increases the reliability of the one-chip microcomputer.

Since no decoding circuit is used, there is no possibility that the data will be read or written without permission when the test control cipher signal is known to a third party, which assures a very high security of data protection.

In the bus line control circuit 21, instead of the process of changing the address that the CPU 10 is to execute first, to a specific address, a signal that erases the data in the nonvolatile memory 14 may be outputted when the security flag monitor circuit 25 has recognized the test mode after shipment.

While in the embodiment, the one-chip microcomputer that incorporates the test-only memory 17 and carries out a memory test by executing the contents of the memory test program stored in the memory, the present invention is not restricted to the embodiment.

For instance, when the test-only memory 17 is not used, the CPU may be disconnected completely from the bus line 11 after the mode has been changed to the test mode, and the input/output control circuit section 15 may be also controlled so that access to all of the memories can be switched directly from the input/output terminal, thereby enabling the data to be read and written from and into each of the memories.

In this case, when the security flag monitor circuit 25 has recognized the test mode after shipment, a signal for erasing the data in the nonvolatile memory 14 is outputted. As described earlier, with the memory data protection circuit of the present invention, when the security flag monitor circuit 24 has monitored the security flag at the time of turning on the power supply and has recognized that the security flag indicates the test mode before shipment, the bus line control circuit 21 brings the connection of the bus line into a state where a shift to the test mode is possible. This enables the CPU 10 to execute the contents of the memory test program stored in the test-only memory 17.

When the security flag monitor circuit has recognized that the security flag indicates the normal operation mode after shipment, the bus line control circuit 21 brings the connection of the bus line into a state where the test-only memory 17 is disconnected from the bus line. This makes a shift to the test mode impossible, causing the CPU 10 to execute the contents of the program stored in the ROM 12. When the security flag monitor circuit has recognized that the security flag indicates the test mode after shipment, the bus line control circuit 21 disconnects the ROM 12 from the bus line 22 to enable a shift to the test mode and erases the data stored in the nonvolatile memory 14. Although the memories except for the ROM 12 can be tested after the data in the nonvolatile memory 14 has been erased, a third party cannot access the ROM 12 and therefore cannot get the correct data (the data before erasure) in the nonvolatile memory 14, even if they attempt to read the internal data in the one-chip microcomputer, making use of the test mode in that state. Because the third party only can get meaningless data, there is no security problem.

Accordingly, with the data protection circuit of the present invention, since a memory test can be carried out easily at any time both before and after the shipment of the one-chip microcomputer, the reliability of the one-chip microcomputer can be increased.

Furthermore, because no decoding circuit is used, there is no possibility that the data will be read and written without permission when the test control cipher signal is known to the third party, the security of data protection is very high.

Additional advantages and modifications will readily occur to those skilled in the art. Therefore, the invention in its broader aspects is not limited to the specific details, and representative embodiments shown and described herein. Accordingly, various modifications may be made without departing from the spirit or scope of the general inventive concept as defined by the appended claims and their equivalents.

We claim:

1. A memory data protection circuit provided in a one-chip microcomputer having a CPU, a ROM, a volatile memory, and a nonvolatile memory formed on a single chip, said memory data protection circuit comprising:

a first bus line connected to said CPU, said volatile memory, said nonvolatile memory, and an input/output control circuit;

a second bus line connected to a ROM storing a system program;

a third bus line connected to a test-only memory storing a memory test program;

a security flag storage circuit to which a security flag consisting of a plurality of bits is inputted, into which said security flag is written on receipt of a control signal so that the logic level of said flag may change in one direction, and which stores the security flag in a state where the flag cannot be rewritten once the flag has been written;

a power-on reset circuit that outputs a power-on reset signal when the power supply for the one-chip microcomputer has been turned on;

a security flag monitor circuit that reads the security flag stored in said security flag storage circuit when receiving said power-on reset signal and recognizes the contents of the flag; and a bus line control circuit which controls the connection of said first bus line, said second bus line and said third bus line according to the recognition result of said security flag monitor circuit, and which controls their connection so that a shift to the test mode may be possible, when said security flag indicates the test mode before shipment, controls their connection so that a shift to the test mode may be impossible, when said security flag indicates the normal operation mode after shipment, and controls their connection so that a shift to the test mode may be possible with said ROM being disconnected from said second bus line, when said security flag indicates the test mode after shipment.

2. A memory data protection circuit according to claim 1, wherein said security flag storage circuit rewrites said security flag consisting of a plurality of bits so that the flag may have a specific pattern according to a combination of the logic levels of a chip enable signal input /CE and a write/read control signal input /WR.

3. A memory data protection circuit according to claim 1, wherein said bus line control circuit further changes the address that said CPU is to executed first to a specific address, when said security flag indicates the test mode after shipment, and said CPU erases the data stored in said nonvolatile memory by executing the contents of the specific address.

4. A memory data protection circuit according to claim 1, wherein said security flag monitor circuit further outputs a signal for erasing the data in said nonvolatile memory, when said security flag indicates the test mode after shipment.

5. A memory data protection circuit provided in a one-chip microcomputer having a CPU, a ROM, a volatile memory, and a nonvolatile memory formed on a single chip, said memory data protection circuit comprising:

a first bus line connected to said CPU, said volatile memory, said nonvolatile memory, and an input/output control circuit;

a second bus line connected to a ROM storing a system program;

a third bus line connected to a test-only memory storing a memory test program;

a security flag storage circuit to which a security flag consisting of a plurality of bits is inputted, into which said security flag is written on receipt of a control signal so that the logic level of said security flag may change in one direction, and which stores the security flag in a state where the flag cannot be rewritten once the flag has been written;

a power-on reset circuit that outputs a power-on reset signal when the power supply for the one-chip microcomputer has been turned on;

a security flag monitor circuit that reads the security flag stored in said security flag storage circuit when receiving said power-on reset signal and recognizes the contents of the flag; and a bus line control circuit which controls the connection of said first bus line with said CPU according to the recognition result of said security flag monitor circuit and which, when said security flag indicates the test mode before shipment, disconnects said CPU completely from said first bus line and controls said input/output control circuit section so that access to all of the memories may be controlled directly from the input/output terminal to enable a shift to the test mode and which controls the connection so that a shift to the test mode may be impossible, when said security flag indicates the normal operation mode after shipment, and which controls the connection so that a shift to the test mode may be possible with said ROM being disconnected from said second bus line, when said security flag indicates the test mode after shipment.

6. A memory data protection circuit according to claim 5, wherein said security flag monitor circuit further outputs a signal for erasing the data in said nonvolatile memory, when said security flag indicates the test mode after shipment.

* * * * *